(12) United States Patent
Zhuang et al.

(10) Patent No.: US 11,240,800 B2
(45) Date of Patent: Feb. 1, 2022

(54) METHOD TO DETERMINE THE STARTING SUBFRAME OF DATA CHANNEL

(71) Applicant: HFI Innovation Inc., Hsinchu County (TW)

(72) Inventors: Xiangyang Zhuang, Lake Zurich, IL (US); Feifei Sun, Beijing (CN)

(73) Assignee: HFI INNOVATION INC., Zhubei (TW)

( * ) Notice: Subject to any disclaimer, the term of this patent is extended or adjusted under 35 U.S.C. 154(b) by 15 days.

(21) Appl. No.: 16/584,949

(22) Filed: Sep. 27, 2019

(65) Prior Publication Data

US 2020/0029328 A1 Jan. 23, 2020

Related U.S. Application Data

(63) Continuation of application No. 15/017,955, filed on Feb. 8, 2016, now Pat. No. 10,470,177, which is a (Continued)

(30) Foreign Application Priority Data

Aug. 9, 2013 (WO) ................ PCT/CN2013/081200

(51) Int. Cl.
*H04W 72/04* (2009.01)
*H04W 52/02* (2009.01)
(Continued)

(52) U.S. Cl.
CPC ..... *H04W 72/0446* (2013.01); *H04L 27/2656* (2013.01); *H04W 52/0216* (2013.01);
(Continued)

(58) Field of Classification Search
CPC .................. H04W 72/0453; H04W 72/0446
See application file for complete search history.

(56) References Cited

U.S. PATENT DOCUMENTS 8,995,432 B2 * 3/2015 Yi .................. H04W 76/28
370/352
10,009,882 B2 * 6/2018 You ..................... H04W 74/04
(Continued)

FOREIGN PATENT DOCUMENTS

CN       101483921 A    1/2008
CN       101610132 A    6/2008
(Continued)

OTHER PUBLICATIONS

International Search Report and Written Opinion of International Search Authority for PCT/CN2014/083993 dated Oct. 27, 2014 (12 pages).
(Continued)

*Primary Examiner* — Raj Jain
(74) *Attorney, Agent, or Firm* — Helen Mao; Zheng Jin; Imperium Patent works

(57) ABSTRACT

Apparatus and method are provided to determine the starting subframe of a data channel. In one novel aspect, the UE monitors one or more control channel candidates, which at least one of the control channel candidate occupies a plurality of the subframes. The UE detects a control channel intended for the UE, decodes the control channel and determines the starting subframe of the data channel based on the control channel and a known gap. In another novel aspect, the UE further obtains a subframe indicator from the control channel. The subframe indicator signals either the number of subframes between the starting subframe of the data channel and the starting subframe of the control channel, or the number of subframes of the control channel, or the starting subframe of the data channel. In another embodiment, predefined rule can be applied to the subframe indicator to determining the starting subframe of the data channel.

12 Claims, 6 Drawing Sheets

Related U.S. Application Data continuation of application No. PCT/CN2014/083993, filed on Aug. 8, 2014.

(51) Int. Cl.
  *H04L 27/26* (2006.01)
  *H04W 72/12* (2009.01)
  *H04L 5/00* (2006.01)

(52) U.S. Cl.
  CPC ....... *H04W 72/042* (2013.01); *H04W 72/044* (2013.01); *H04W 72/0413* (2013.01); *H04W 72/0453* (2013.01); *H04L 5/0007* (2013.01); *H04L 5/0044* (2013.01); *H04L 5/0053* (2013.01); *H04W 72/1289* (2013.01)

(56) References Cited

U.S. PATENT DOCUMENTS

| | | | |
|---|---|---|---|
| 10,470,177 B2* | 11/2019 | Zhuang | H04W 52/0216 |
| 2004/0224697 A1 | 11/2004 | Hakkinen et al. | 455/450 |
| 2009/0196204 A1 | 8/2009 | Astely | H04W 72/12 |
| 2010/0215010 A1* | 8/2010 | Tsuruoka | H04W 28/20 370/329 |
| 2010/0260057 A1* | 10/2010 | Lee | H04J 11/0069 370/252 |
| 2011/0188428 A1 | 8/2011 | Ishii | H04W 52/02 |
| 2011/0235584 A1 | 9/2011 | Chen | H04W 28/04 |
| 2012/0257554 A1 | 10/2012 | Kim | H04W 72/04 |
| 2012/0263127 A1 | 10/2012 | Moon et al. | 370/329 |
| 2013/0010715 A1 | 1/2013 | Dinan | 370/329 |
| 2013/0058233 A1* | 3/2013 | Kim | H04L 5/0098 370/252 |
| 2013/0136095 A1 | 5/2013 | Nishio | H04W 72/04 |
| 2013/0301597 A1 | 11/2013 | Kim | H04W 72/04 |
| 2014/0010189 A1* | 1/2014 | Tian | H04W 36/0088 370/329 |
| 2014/0071915 A1 | 3/2014 | Papasakellariou et al. | 370/329 |
| 2015/0117287 A1* | 4/2015 | Kim | H04W 72/0453 370/311 |
| 2015/0223215 A1 | 8/2015 | Kim et al. | 370/329 |
| 2015/0334689 A1* | 11/2015 | Nishio | H04L 5/0053 370/329 |
| 2016/0112913 A1 | 4/2016 | Malkamaki et al. | 455/444 |
| 2016/0157229 A1* | 6/2016 | Zhuang | H04W 72/042 370/329 |

FOREIGN PATENT DOCUMENTS

| | | |
|---|---|---|
| CN | 101939939 A | 2/2009 |
| CN | 102783053 A | 12/2009 |
| CN | 102714562 A | 1/2010 |
| CN | 102823176 A | 3/2010 |
| JP | WO2012032726 A1 | 9/2010 |
| KR | WO2012102510 A2 | 1/2012 |
| WO | WO2012109542 A1 | 2/2011 |

OTHER PUBLICATIONS

SIPO, Search Report for the CN patent application 201480003579.5 (no English translation is available) dated May 3, 2017 (6 pages).
SIPO, Search Report for the CN patent application 201480003579.5 (no English translation is available) dated Oct. 17, 2017 (8 pages).
China National Intellectual Property Administration (CNIPA), office action for related Chinese patent application CN2019/10936329.1 dated Sept. 2, 2021.( 7 pages).
R1-120452 3GPP TSG-RAN WG1 Meeting #68, LG Electronics. "Resource Configuration for E-PDCCH based SS", Dresden, Germany Feb. 6-10, 2012 (3 pages).
R1-132234 3GPP TSG RAN WG1 Meeting #73, LG Electronics " Further consideration points for provision of MTC UEs", Fukuoka, Japan, May 20-24, 2013 (3 pages).
R1-124080, 3GPP TSG RAN WG1 Meeting #70bis, Huawei, HiSilicon, "Remaining details of EPDCCH/PDSCCH/PDSCH start symbol configuration", San Diego, US, Oct. 8-12, 2012 (2 pages).
R1-130757, 3GPP TSG RAN WG1 Meeting #72, Huawei, HiSilicon, Sharp, CATT, LG Electronics, Joint proposal for corrections to PDSCH/EPDCCH resource mapping and PDSCH/EPDCCH starting position for CoMP in 35.213, St. Julian, Malta, Jan. 28—Feb. 1, 2013 (6 pages)

* cited by examiner

METHOD TO DETERMINE THE STARTING SUBFRAME OF DATA CHANNEL

CROSS REFERENCE TO RELATED APPLICATIONS

This application is a continuation, and claims priority under 35 U.S.C. § 120 from nonprovisional U.S. patent application Ser. No. 15/017,955, entitled "METHOD TO DETERMINE THE STARTING SUBFRAME OF DATA CHANNEL", filed on Feb. 8, 2016, the subject matter of which is incorporated herein by reference. application Ser. No. 15/017,955, in turn, is a continuation and claims priority under 35 U.S.C. § 120 and § 365(c) from International Application No. PCT/CN2014/083993, with an international filing date of Aug. 8, 2014, which in turn claims priority from International Application No. PCT/CN2013/081200, entitled "METHOD TO DETERMINE THE STARTING SUBFRAME OF DATA CHANNEL" filed on Aug. 9, 2013, the subject matters of which are incorporated herein by reference.

TECHNICAL FIELD

The disclosed embodiments relate generally to wireless communication systems, and, more particularly, to method to determine the starting subframe of data channel.

BACKGROUND

Third generation partnership project (3GPP) and Long Term Evolution (LTE) mobile telecommunication systems provide high data rate, lower latency and improved system performances. However, such systems are optimized for regular data communications. Normally there is no need for repeatedly retransmissions. Therefore, in the current mobile network system the starting subframes of uplink or downlink data channels are well defined.

As the applications on mobile networks evolve, the above assumptions for the starting subframes of the data channel may not be true. For example, machine-to-machine (M2M) applications required low-cost devices and improved coverage other than current cellular communication system. For example, some smart-metering deceives suffer a significantly larger path-loss (e.g., 20 dB path loss) than that in the typical operation condition of normal devices, which are often installed in the basements of residential buildings or locations shielded by foil-backed insulation, metalized windows, or traditional thick-walled building construction. In order to serve these devices, 3GPP RAN1 working group have studied for coverage improvement and cost reduction for these MTC devices in coverage-hole scenario. Some potential solutions have been identified such as repetition of the physical channels to improve the coverage. In addition, cost reduction techniques are studied, including reducing the data buffer size and operation bandwidth, reducing receiving the antenna number and so on. With repetition of most of the physical channels, there may be misunderstanding between base station and mobile station on the start time of the transmission of some physical channels. Therefore, it is important to have a method to determine the start subframe of the physical channels. The benefit of determining the start subframe is not limited to the examples above Improvements and enhancements are required for UE to determine the start subframe of the physical channels.

SUMMARY

Apparatus and method are provided to determine the starting subframe of a data channel. In one novel aspect, the UE monitors one or more control channel candidates, which at least one of the control channel candidate occupies a plurality of the subframes. The UE detects a control channel intended for the UE and decodes the control channel. In one embodiment, the UE determines the starting subframe of the data channel based on the control channel and a known gap. The known gap can be either a gap from the starting subframe of the data channel to the starting subframe of the control channel, or a gap from the starting subframe of the data channel to the end subframe of the control channel.

In another novel aspect, the UE further decodes a subframe indicator from the decoded control channel. In one embodiment, the subframe indicator signals the number of subframes between the starting subframe of the data channel and the starting subframe of the decoded control channel. In another embodiment, the subframe indicator signals the number of subframes between the starting subframe of the data channel and the end subframe of the decoded control channel. In another embodiment, the subframe indicator signals the starting subframe of the data channel. In yet another embodiment, a predefined rule is applied to the subframe indicator before applying the value to determining the starting subframe of the data channel.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
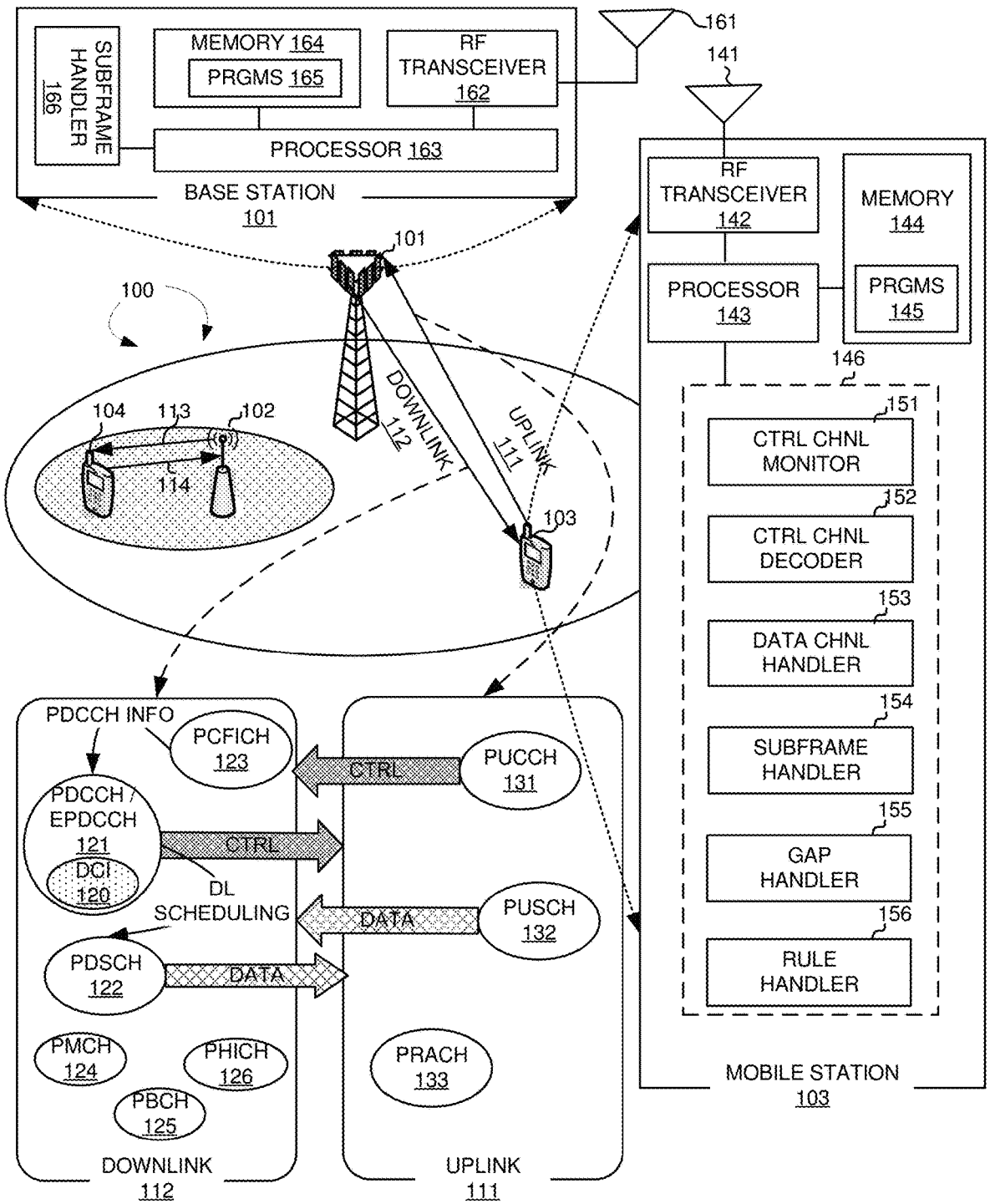
FIG. 1 illustrates an exemplary mobile communication network with UEs determining the start subframe of a data channel based on information from control frames occupying multiple subframes in accordance with embodiments of the current invention.

FIG. 1 illustrates an exemplary mobile communication network 100 with UEs determining the start subframe of a data channel based on information from control frames occupying multiple subframes in accordance with embodiments of the current invention. Wireless communication system 100 includes one or more fixed base infrastructure units forming a network distributed over a geographical region. The base unit may also be referred to as an access point, access terminal, base station, Node-B, eNode-B (eNB), or by other terminology used in the art. As illustrated in FIG. 1, the one or more base stations 101 and 102 serve a number of mobile stations or UEs 103 and 104 within a serving area, for example, a cell, or within a cell sector. In some systems, one or more base stations are communicably coupled to a controller forming an access network that is communicably coupled to one or more core networks. The disclosure is not limited to any particular wireless communication system.

Serving base stations 101 and 102 transmit downlink communication signals 112 and 113 to mobile stations 103 and 104, respectively, in the time and/or frequency domain. Mobile stations 103 and 104 communicate with one or more base units 101 and 102 via uplink communication signals 111 and 114, respectively. In one embodiment, mobile communication network 100 is an OFDM/OFDMA system comprising multiple base stations, including eNB 101, eNB 102 and a plurality of mobile stations, including mobile station 103 and mobile station 104. eNB 101 communicates with mobile station 103 via uplink 111 and downlink 112. When there is a downlink packet to be sent from eNB to mobile station, each mobile station gets a downlink assignment, e.g., a set of radio resources in a physical downlink shared channel (PDSCH). When a UE needs to send a packet to eNB in the uplink, the mobile station gets a grant from the eNB that assigns a physical downlink uplink shared channel (PUSCH) consisting of a set of uplink radio resources. The mobile station gets the downlink or uplink scheduling information from a physical downlink control channel (PDCCH) or an enhanced physical downlink control channel (EPDCCH) that is targeted specifically to that mobile station. The downlink or uplink scheduling information and the other control information, carried by PDCCH, is referred to as downlink control information (DCI). FIG. 1 also illustrates exemplary different physical channels for downlink 112 and uplink 111. Downlink 112 has a PDCCH or EPDCCH 121, a PDSCH 122, a Physical control formation indicator channel (PCFICH) 123, a physical multicast channel (PMCH) 124, a physical broadcast channel (PBCH) 125, and a physical hybrid ARQ indicator channel (PHICH) 126. PDCCH/EPDCCH 121 sends downlink control signals to mobile stations. DCI 120 is carried by PDCCH/EPDCCH 121. PDSCH 122 sends data information to mobile stations. PCFICH 123 sends PDCCH information; such as dynamically indicates the number of symbols to be used by PDCCH 121. PMCH 124 carries multicast information. PBCH 125 carries Master Information Block (MIB) for early detection by mobile stations and cell-wide coverage. PHICH carries hybrid ARQ information indicating whether the eNB has correctly received a transmission on the PUSCH. Uplink 111 includes a PUCCH 131, a PUSCH 132 and a physical random access channel (PRACH) 133, which carries random access information.

In current LTE system, PDCCH or EPDCCH is transmitted in one subframe and PDSCH is transmitted in the same subframe. PUSCH starts to transmit four subframes after the subframe transmitting PDCCH or EPDCCH for FDD. For TDD, different subframe gaps between PUSCH and the PDCCH conveying the uplink scheduling information or corresponding or Physical Hybrid ARQ Indicator Channel (PHICH) are defined for different uplink-downlink configurations in 3GPP TS 36.213. More than one transmission timing interval (TTI) can be bundled for a PUSCH transmission.

In one embodiment, mobile communication network 100 utilizes OFDMA or a multi-carrier based architecture including Adaptive Modulation and Coding (AMC) on the downlink and next generation single-carrier (SC) based FDMA architecture for uplink transmissions. SC based FDMA architectures include Interleaved FDMA (IFDMA), Localized FDMA (LFDMA), DFT-spread OFDM (DFT-SOFDM) with IFDMA or LFDMA. In OFDMA based systems, remotes units are served by assigning downlink or uplink radio resources that typically consists of a set of sub-carriers over one or more OFDM symbols. Exemplary OFDMA based protocols include the developing Long Term Evolution (LTE) of the 3GPP UMTS standard and IEEE 802.16 standard. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. In alternate embodiments, communication system may utilize other cellular communication system protocols including, but not limited to, TDMA or direct sequence CDMA.

For coverage-hole devices, PDCCH or EPDCCH may need repetitions across multiple subframes. In the meanwhile, the PDSCH and/or PUSCH of the devices may also be across subframe for transmission, retransmission or repetitions. The repetitions number, which is the number of subframes occupied by the data channel or the control channel, may or may not be the same. Therefore, a method to determine the starting subframe of data channel reception or transmission is necessary.

In one embodiment of the disclosure, a method for a mobile station to determine the starting subframe of a data channel includes: monitoring one or more control channel candidates wherein at least one candidate occupies radio resources from a plurality of subframes, or each candidate occupies radio resources from a plurality of subframes; decoding a control channel intended for the mobile station; determining the starting subframe of a data channel from the decoded control channel. In one example, the data channel is downlink data channel (e.g., PDCCH in LTE system). In another example, the data channel is uplink data channel (e.g., PUSCH in LTE system). The control channel is PDCCH or EPDCCH in LTE system. Alternatively, the control channel can be a physical channel for hybrid ARQ indicator transmission (e.g., PHICH in LTE system).

In one embodiment, the determining the starting subframe of a data channel from the decoded control channel further includes: determining the starting subframe of the data channel based on the starting subframe of the decoded control channel and a known gap from the starting subframe of the data channel to the starting subframe of the decoded control channel. In one example, the gap is predefined. Alternatively, the gap is configured by a higher-layer message (e.g., Radio Resource Control (RRC) message in LTE system). Because the gap is known to the mobile station, the mobile station knows the starting subframe of the data channel corresponding to each control channel candidate when the mobile station monitors the set of control channel candidates. In one embodiment, the gap is big enough to ensure the starting subframe of data channel is always after the end subframe of the decoded control channel, especially for uplink data channel transmission. The mobile station may obtain the resource allocation (or the uplink grant) of the data channel in each subframe in the decoded control channel. The mobile station may only receiving or buffer the data channel resources indicated by the decoded control channel. In another embodiment, the mobile station may not know the resource allocation for the data channel. For example, the starting subframe of the data channel is before the end subframe of the decoded control channel, or mobile station cannot decode the control channel intended for the mobile station conveying the resource allocation of the data channel in time. The mobile station needs to buffer all the potential data channel resources from the starting subframe of the data channel. The potential data channel resources may be the whole resources in one subframe. Alternatively, the potential data channel resources is a subset of the whole resources and the subset is known to the mobile station. The subset may be pre-defined or configured by a higher-layer message.

It is noted that, with the number of subframes occupied by the decoded control channel and the gap from the starting time of the data channel to the end of the decoded control channel, the gap from the starting time of the data channel to the starting time of the decoded control channel can be calculated and is also known to the mobile station. However, the number of subframes occupied by the decoded control channel may be unknown to the mobile. The mobile station needs to detect the number of subframes occupied by the decoded control channel.

The number of the plurality of subframes occupied by the each control channel candidate may be unknown to the mobile station before successfully decoded one or more of the control channel candidates (i.e., the decoded control channel intended for the mobile station). The mobile station needs to detect the number of subframes occupied by the decoded control channel. In another embodiment, determining the starting subframe of a data channel from the decoded control channel further includes: detecting the number of subframes occupied by the decoded control channel; and determining the starting subframe of the data channel based on the detected number of subframes occupied by the decoded control channel and a known gap from the starting subframe of the data channel to the end subframe of the decoded control channel. In one example, the gap is pre-defined. Alternatively, the gap is configured by a higher-layer message (e.g., Radio Resource Control (RRC) message in LTE system). The gap equal to zero is a special case, which means the data channel starts on the end subframe of the decoded control channel. The gap can also be smaller than zero, and this means the data channel starts before the end subframe of the decoded control channel. In this case, the mobile station needs to buffer all the potential data channel resources from the starting subframe of the data channel. When the gap is bigger than zero, the data channel starts after the end subframe of the decoded control channel. For uplink data channel transmission, the gap is always bigger than zero.

The mobile station can detect the number of subframes occupied by the decoded control channel. However, the control channel may be transmitted in more subframes than the mobile station detected. For example, the control channel may be repeated in plurality of subframes with the repetition of the same contented. As a result, the mobile station may early decode the control channel. In this case, there may be a misunderstanding between the mobile station and the base station about the number of subframes occupied by the decoded control channel. Therefore, the number of subframes occupied by the decoded control channel needs to be pre-defined or configured. In one embodiment, the number of subframes occupied by the control channel is configured by a higher-layer message. In another embodiment, the number of subframes occupied is indicated in the decoded control channel.

In one embodiment, the determining the starting subframe of a data channel from the decoded control channel further includes obtaining a subframe indicator in the decoded control channel; and determining the starting subframe of the data channel based on the subframe indicator. In one embodiment, the subframe indicator signals the number of subframes between the starting subframe of the data channel and the starting subframe of the decoded control channel. In another embodiment, the subframe indicator signals the number of subframes between the starting subframe of the data channel and the end subframe of the decoded control channel. In another embodiment, the subframe indicator signals the subframe index on which the data channel starts. The subframe index can be comprised of one or more periodic indexes. For example, the subframe index can be comprised of both the radio frame index and the subframe index within one radio frame. It also can be one periodic index such as the subframe index within a fixed period. In another example, the subframe index can be a subframe gap to a reference subframe known to both the mobile station and the base station.

In another embodiment, determining the starting subframe of a data channel from the decoded control channel further includes: obtaining a subframe indicator in the decoded control channel; and determining the starting subframe of the data channel based on the subframe indicator and a known gap from the starting subframe of the data channel to the end subframe of the decoded control channel. The gap can be predefined or configured by a higher-layer message. The subframe indicator may signal the number of subframes occupied by the control channel that contains the subframe indicator.

In another embodiment, the determining the starting subframe of a data channel from the decoded control channel further includes: obtaining a subframe indicator in the decoded control channel; and determining the starting subframe of the data channel based on the subframe indicator and a predefined rule. In one embodiment, the predefined rule further basing on mobile station index. For example, the mobile station index can be a group index shared with at least another mobile station configured by the base station. In another example the mobile station index is mobile station identity (ID) or an RNTI configured by the base station. In another embodiment, the predefined rule further bases on the base station identity (ID). The base station ID can be a physical ID or a virtual ID.

The mobile station can obtain the subframe indicator after decoded the control channel. If the mobile station knows that the starting subframe of data channel is always after the end subframe of the control channel intended for the mobile station(e.g., pre-defined), the mobile station may only receiving or buffer the data channel resources indicated by the decoded control channel. In another example, the starting subframe of data channel may not always be before the end subframe of control channel. This may only happen to downlink data channel receiving. In this case, the mobile station needs to buffer all the potential data channel resources from the starting subframe of the data channel.

Moreover, the data channel may also occupy one or more subframes, for example, need repetitions across multiple subframes. The mobile station needs to know the number of subframe occupied by the data channel (or repetition number of the data channel) before decoding or transmission. In one embodiment, the number of subframes occupied by the data channel can be configured by high-layer message. In another embodiment, the number of subframes occupied by the data channel can be indicated in the decoded control channel. Alternatively, the number of subframes occupied by the data channel can be implied by the number of subframes occupied by the decoded control channel, e.g., the same with the number of subframes occupied by the decoded control channel.

FIG. 1 further shows a simplified block diagram of base station 101 in accordance to the current invention. Base station 101 has an antenna 161, which transmits and receives radio signals. A RF transceiver module 162, coupled with the antenna, receives RF signals from antenna 161, converts them to baseband signals and sends them to processor 163. RF transceiver 162 also converts received baseband signals from processor 163, converts them to RF signals, and sends out to antenna 161. Processor 163 processes the received baseband signals and invokes different functional modules to perform features in base station 101. Memory 164 stores program instructions and data 165 to control the operations of base station 101.

Base station 101 also includes a subframe handler 166 in accordance to embodiments of the current invention. Subframe handler 166 can be implemented by software, firmware, hardware, or any combination thereof. In one example, subframe handler 166 configures a set of radio resources for control channels; encodes the control channel via processors 163 through a control module. In one embodiment, subframe handler 166 inserts indicators to each control channel via processors 163 through a control module. The data channels are modulated and encoded via a data channel module. Base station 101 transmits the encoded control channels and data channels by transceiver 162 via antenna 161.

FIG. 1 also shows a simplified block diagram of mobile station 103 in accordance to the current invention. Mobile station 103 has an antenna 141, which transmits and receives radio signals. A RF transceiver module 142, coupled with the antenna, receives RF signals from antenna 141, converts them to baseband signals and sends them to processor 143. RF transceiver 142 also converts received baseband signals from processor 143, converts them to RF signals, and sends out to antenna 141. Processor 143 processes the received baseband signals and invokes different functional modules to perform features in mobile station 103. Memory 144 stores program instructions and data 145 to control the operations of mobile station 103.

Mobile station 103 includes modules 146 that carry out different tasks in accordance with embodiments of the current invention. A control channel monitor 151 monitors one or more control channel candidates and determining a control channel intended for mobile station 103. A control channel decoder 152 decodes the control channel intended for mobile station 103. A data channel handler 153 determines a starting subframe of a data channel for the UE based on the decoded control channel. A subframe handler 154 obtains a subframe indicator from the decoded control channel and passes the subframe indicator to data channel handler 153 to determine the starting subframe of the data channel. A gap handler 155 obtains a known gap and passes the known gap to data channel handler 153 to determine the starting subframe of the data channel. A rule handler 156 applies predefined rules to the subframe indicator to determine the starting subframe of the data channel for mobiles station 103.

Figure 2:
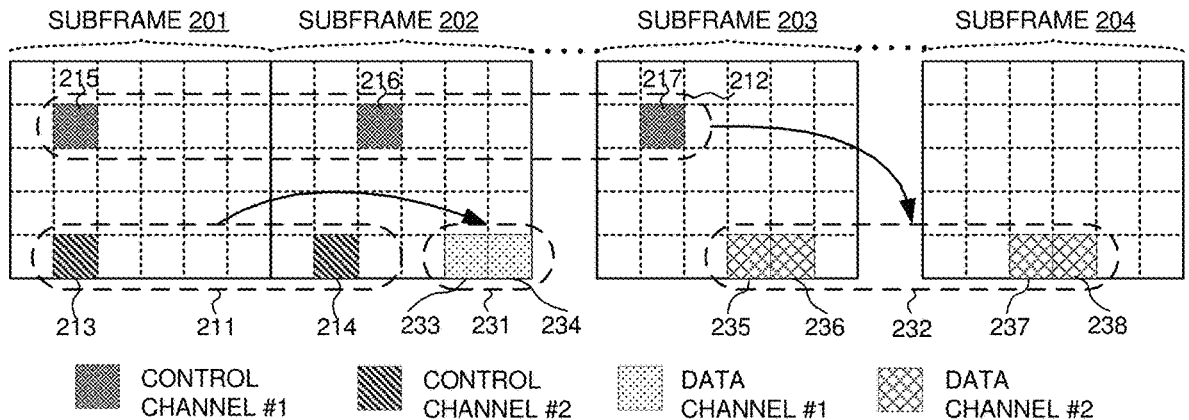
FIG. 2 illustrates an exemplary diagram of control channels and data channels with multiple subframes in accordance with embodiments of the present invention.

FIG. 2 illustrates an exemplary diagram of control channels and data channels with multiple subframes in accordance with embodiments of the present invention. The UE monitors a set of control channel candidates, for example channel candidate 211 and 212. Each candidate occupies radio resources from different subframes. For example, control channel 211 occupies radio resources 213 and 214 of subframes 201 and 202, respectively. Control channel 212 occupies radio resources 215, 216 and 217 of subframes 201, 202 and 203, respectively. The mobile station blindly detects for a control channel intended for the mobile station. For example, the mobile station may detect the control channel candidates 211 and 212, but only decodes control channel 211. The UE determines the starting subframe of a data channel 231 from the decoded control channel 211. Similar to the control channels, the data channel may occupy radio resources for one or more subframes. For example, data channel 231 occupies radio resources 233 and 234, which are both in subframe 202. In another example, though, data channel 232 occupies radio resources 235, 236, 237 and 238. Radio resources 235 and 236 are in subframe 203 while radio resources 237 and 238 are in subframe 204. In one embodiment, the data channel 231 and 232 is uplink data channel. In another embodiment, the data channel 231 and 232 is downlink data channel. In one embodiment, the control channel 211 or 212 is PHICH. In another embodiment, the control channel 211 or 212 is PDCCH or EPDCCH.

Figure 3:
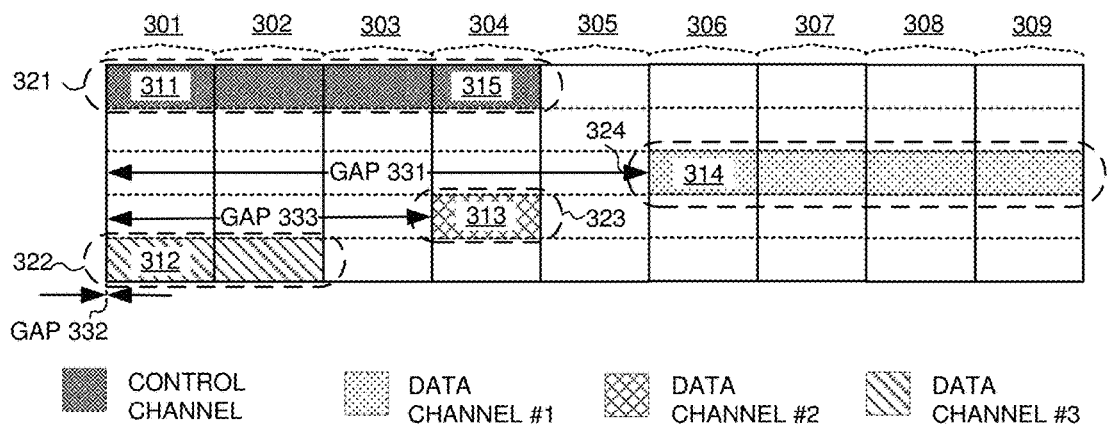
FIG. 3 illustrates determining the starting subframe of a data channel base with a known gap from the starting of the control channel to the starting of the data channel in accordance with embodiments of the present invention.

FIG. 3 is a diagram illustrates determining the starting subframe of a data channel base with a known gap from the starting of the control channel to the starting of the data channel in accordance with embodiments of the present invention. A control channel 321 occupies subframes 301, 302, 303 and 304, having a starting subframe 311 in subframe 301 and an ending subframe 315 in subframe 304. The UE determines the starting of the data channel using a known gap between starting subframe 311 of the control channel for the UE to the starting subframe of the data channel. As shown in FIG. 3, three exemplary data channels 322, 323 and 324 each occupies one or more subframes, with starting subframes 312, 313 and 314, respectively. To determine the starting subframe of data channel 322, the UE obtains a gap 332, which is the number of subframes between starting subframe 311 of control channel 321 and starting subframe 312 of data channel 322. Upon successfully decoding control 321, the UE can determine starting subframe 312 for data channel 322 based on gap 332. Similarly, to determine the starting subframe of data channel 323, the UE obtains a gap 333, which is the number of subframes between starting subframe 311 of control channel 321 and starting subframe 313 of data channel 323. Upon successfully decoding control 321, the UE can determine starting subframe 313 for data channel 323 based on gap 333. To determine the starting subframe of data channel 324, the UE obtains a gap 334, which is the number of subframes between starting subframe 311 of control channel 321 and starting subframe 314 of data channel 324. Upon successfully decoding control 321, the UE can determine starting subframe 314 for data channel 324 based on gap 334.

The gap from the starting subframe of the control channel to the starting subframe of the data channel can be positive, negative and zero. As shown in FIG. 3, gap 334 is five subframes. It is big enough to ensure the starting subframe 314 of data channel 324 is after the end subframe 315 of the decoded control channel 321. The mobile station may obtain the resource allocation (or the uplink grant) of the data channel 324 in each subframes 306 to 309 conveying by the decoded control channel 321. The mobile station may only receive or buffer the data channel resources indicated by the decoded control channel 321. In another embodiment, the starting subframe (e.g., 312 or 313) of the data channel is before or on the end subframe 315 of the decoded control channel 321. In another example, the mobile station cannot decode the control channel 321 conveying the resource allocation of the data channel 324 in time (e.g., cannot decode the control channel 321 before subframe 314 when the data channel 324 starts). The mobile station needs to buffer all the potential data channel resources from the starting subframe 314 of the data channel 324.

Figure 4:
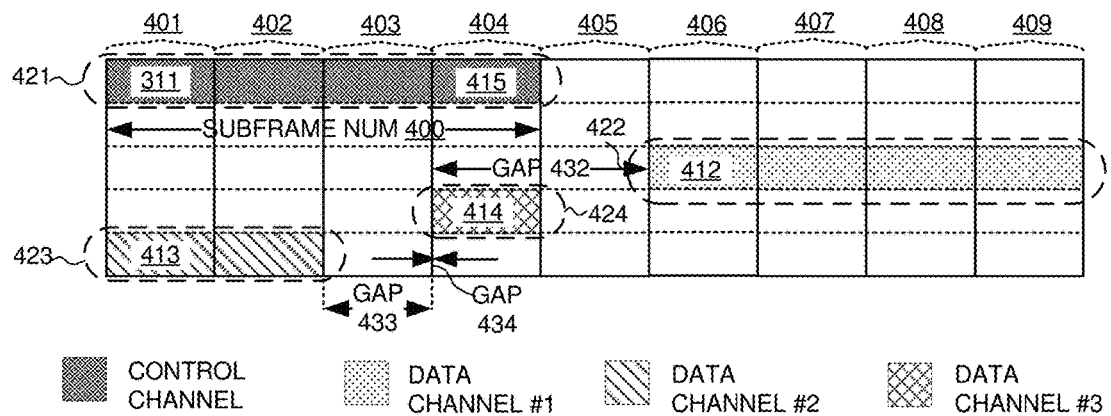
FIG. 4 illustrates an example of determining the starting subframe of data channel determining with the detected number of subframes occupied by the decoded control channel and a known gap in accordance with embodiments of the present invention.

FIG. 4 illustrates an example of determining the starting subframe of data channel determining with the detected number of subframes occupied by the decoded control channel and a known gap in accordance with embodiments of the present invention. A control channel 421 occupies subframes 401, 402, 403 and 404, having a starting subframe 411 in subframe 401 and an ending subframe 415 in subframe 404. The UE determines the starting of the data channel using a known gap between ending subframe 415 of the control channel for the UE to the starting subframe of the data channel. As shown in FIG. 4, three exemplary data channels 422, 423 and 424 each occupies one or more subframes, with starting subframes 412, 413 and 414, respectively. To determine the starting subframe of data channel 422, the UE obtains a gap 432, which is the number of subframes between ending subframe 415 of control channel 421 and starting subframe 412 of data channel 422. Upon successfully decoding control 421, the UE can determine starting subframe 412 for data channel 422 based on gap 432. Similarly, to determine the starting subframe of data channel 423, the UE obtains a gap 433, which is the number of subframes between ending subframe 415 of control channel 421 and starting subframe 413 of data channel 423. Upon successfully decoding control channel 421, the UE can determine starting subframe 413 for data channel 423 based on gap 433. To determine the starting subframe of data channel 424, the UE obtains a gap 434, which is the number of subframes between ending subframe 415 of control channel 421 and starting subframe 414 of data channel 424. Upon successfully decoding control 421, the UE can determine starting subframe 414 for data channel 424 based on gap 434.

The gap from the starting subframe of the control channel to the starting subframe of the data channel can be positive, negative and zero. As shown in FIG. 4, gap 432 is two subframes. It is big enough to ensure the starting subframe 412 of data channel 422 is after the end subframe 415 of the decoded control channel 421. The mobile station may obtain the resource allocation (or the uplink grant) of the data channel 422 in each subframes 406 to 409 conveying by the decoded control channel 421. The mobile station may only receive or buffer the data channel resources indicated by the decoded control channel 421. In another embodiment, the starting subframe (e.g., 413 or 414) of the data channel is before or on the end subframe 415 of the decoded control channel 421. In another example, the mobile station cannot decode the control channel 421 conveying the resource allocation of the data channel 424 in time (e.g., cannot decode the control channel 421 before subframe 414 when the data channel 424 starts). The mobile station needs to buffer all the potential data channel resources from the starting subframe 414 of the data channel 424.

The known gap can be predefined, for example, four subframes gap between the starting subframe of an uplink data channel and the end subframe of the corresponding control channel conveying the uplink grant for the uplink data channel. In another example, one subframe gap between the starting subframe of data channel and the end of the corresponding control channel. With this one subframe gap, the mobile station can decode the control channel and obtain the radio resources information of the data channel. Therefore, the mobile station can only receive and buffer the radio resources of the data channel. This will save the mobile station buffer size and give the base station more flexibility for scheduling. The radio resources information of the data channel can be the number of subframes occupied by the data channel, the physical resource block in each subframe and so on. Alternatively, the gap is configured by higher-layer message, for example RRC message.

The known gap equals to zero is a special case, for example gap 332 in FIG. 3 and gap 434 in FIG. 4. This means, for example, data channel 424 starts to transmit in the same subframe 404 with the end subframe of the decoded control channel 421. The gap may be smaller than zero, for example, gap 433. Data channel 423 starts to transmit in the subframe 413 before the end subframe 415 of the decoded control channel 421. In this case, the mobile station needs to receive and buffer the radio resources, which may convey the data channel 423 before decoding for the control channel 421. The mobile station subsequently needs to decode the data channel. When the known gap is bigger than zero such as gap 432, data channel 422 starts to transmit in subframe 412 after the end subframe 415 of the decoded control channel 421.

Figure 5:
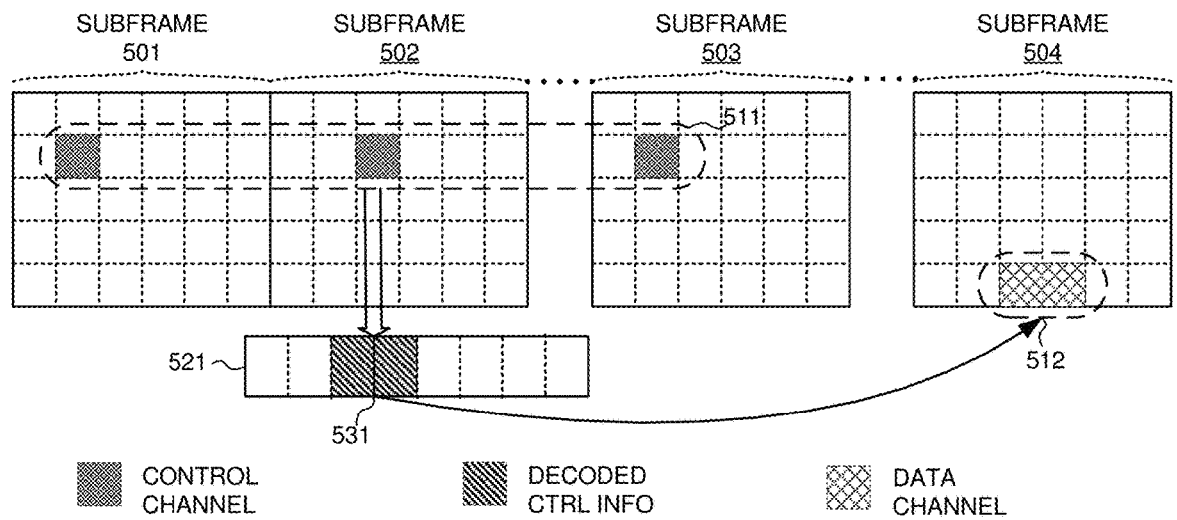
FIG. 5 illustrates an example of determining the starting subframe of a data channel based on a subframe indicator in the decoded control channel in accordance with embodiments of the present invention.

In another novel aspect, the control channel contains a subframe indicator for the UE to determine the starting frame of the data channel. FIG. 5 illustrates an example of determining the starting subframe of a data channel based on a subframe indicator in the decoded control channel in accordance with embodiments of the present invention. A control channel 511 contains radio resources from subframe 501, 502 and 503. The UE decodes control channel 511. In one embodiment, the UE obtains a subframe indicator 531 in a decoded control channel 521. The UE determines the starting subframe for a data channel 512 based on subframe indicator 531.

Figure 6:
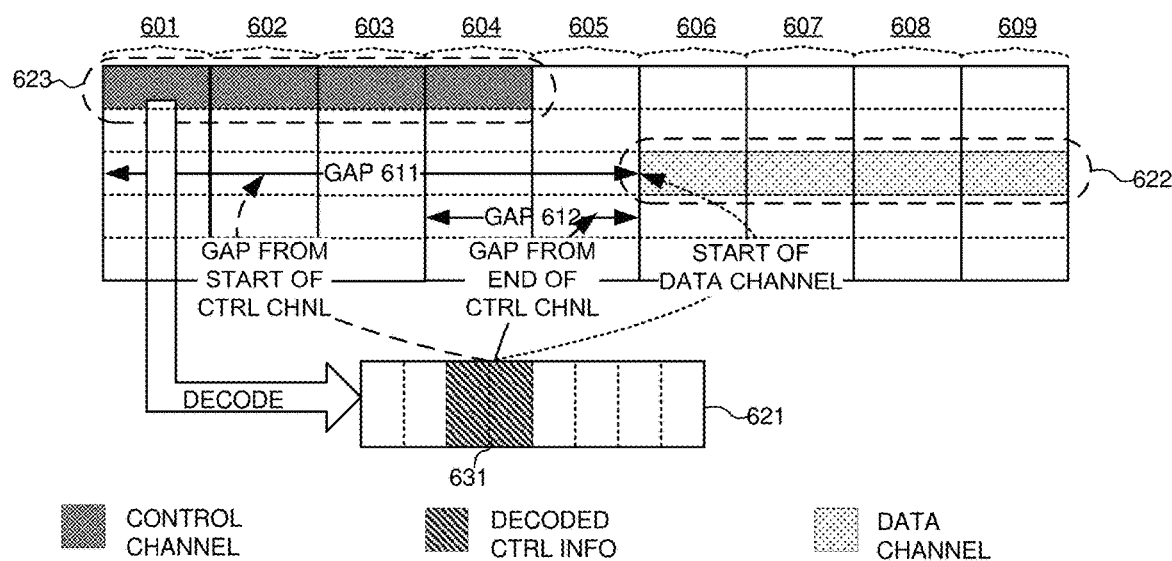
FIG. 6 illustrates some examples of the subframe indicator in accordance with embodiments of the present invention.

FIG. 6 illustrates some examples of the subframe indicator in accordance with embodiments of the present invention. A control channel 623 occupies subframes 601, 602, 603 and 604. A data channel 622 occupies subframes 606, 607, 608, and 609. The UE decodes control channel 623. A decoded control channel 621 contains a subframe information 631. Subframe information 631 contains information for the UE to determine the starting subframe of data channel 622. In one example, subframe indicator 631 signals the number of subframes 611 between a starting subframe 629 of data channel 622 and a starting subframe 627 of control channel 623. In another example, the subframe indicator 631 signals the number of subframes 612 between starting subframe 629 of data channel 622 and an ending subframe 628 of control channel 623. In another example, the subframe indicator 631 signals a subframe index on which the data channel 622 starts. The subframe index can be comprised of one or more periodic indexes. For example, the subframe index may include System Frame Number (SFN) multiplies number of subframe in one radio frame and the subframe index within one SFN. In LTE system, SFN (e.g, from 0~1023) is indicated in the Master information block (MIB). Each radio frame has 10 subframes with subframe index from 0~9. In this case, the range of the subframe index can be from 0~1023. In another embodiment, it also can be one periodic index such as the subframe index within a fixed period, e.g., the subframe index from zero to nine.

Figures 7, 8:
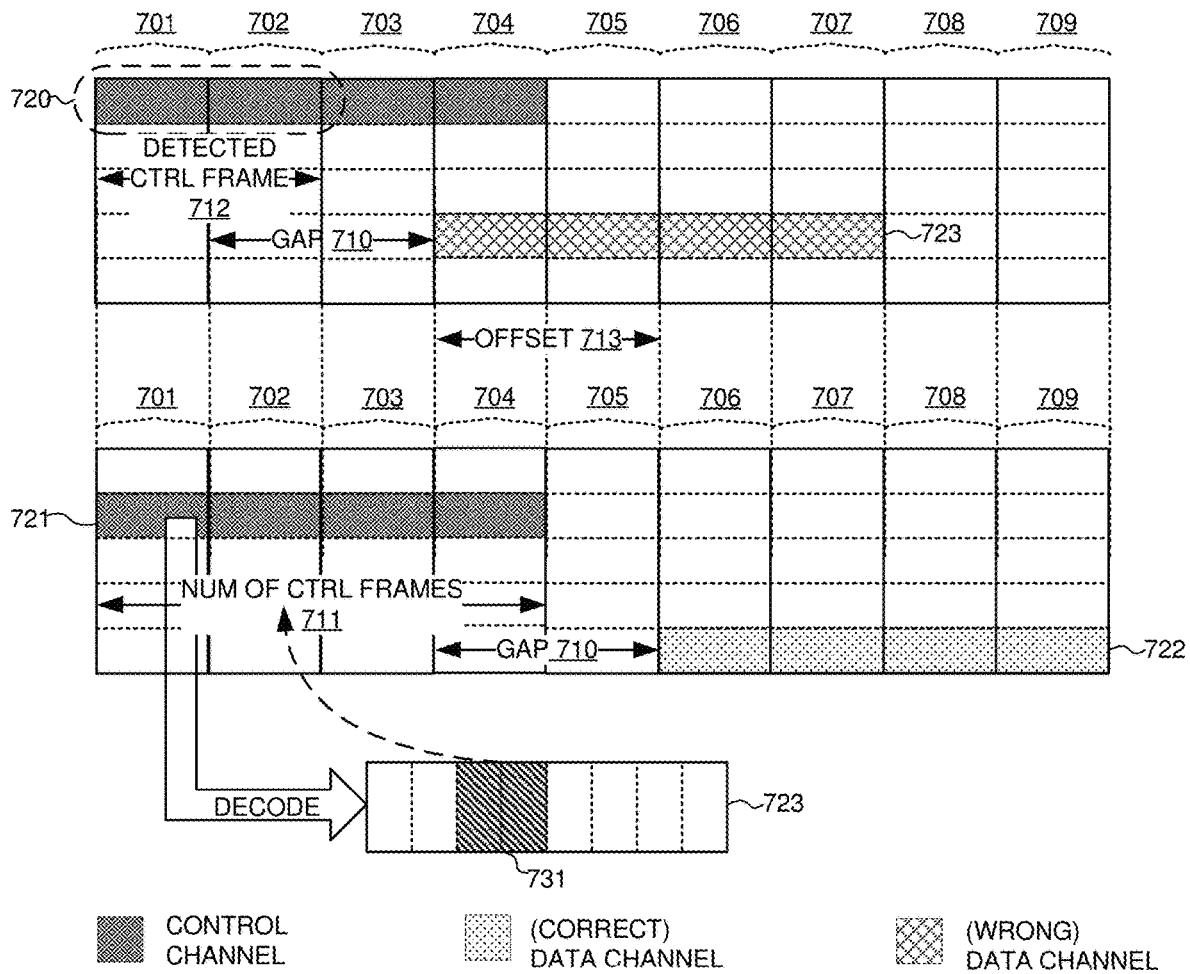
FIG. 7 illustrates an example of determining the starting subframe of a data channel with a subframe indicator and a known gap in accordance with embodiments of the present invention.
FIG. 8 is an example of pre-defined rule of subframe indicator and the number of subframes occupied by the control channel.

FIG. 7 illustrates an example of determining the starting subframe of a data channel with a subframe indicator and a known gap in accordance with embodiments of the present invention. A control channel 721 occupies subframes 701, 702, 703 and 704. A data channel 722 occupies subframes 706, 707, 708, and 709. In one embodiment, the mobile station obtains a subframe indicator 731 in a decoded control channel 723. The mobile station determines the starting subframe data channel 722 based on the subframe indicator 731 and known gap 710 from the starting subframe data channel 722 to the ending subframe of control channel 721. Gap 710 can be predefined or configured by a higher-layer message. Subframe indicator 731 signals the number of subframes 711 occupied by control channel 721 intended for the mobile station. In one practical embodiment, the control channel is transmitted from subframe 701 to subframe 704 with the number of subframes 711. The control channel repeated in multiple subframes and each subframe carries full information of the control channel. The mobile station attempts to decode the control channel and it may early successfully decode the control channel with 702 subframes. Without an additional indicator of the number of subframes occupied by the control channel 721 intended for the mobile station, the mobile station may only detect part of the control channel, such as channel 720, which occupies subframes 701 and 702 only. The mobile station based on known gap 710 would determine the data channel starts from subframe 703, resulting in a wrong data channel 723. To avoid this situation, the indicator of number of subframes occupied by the decoded control channel can be carried in the decoded control channel. The indicator signals the actual number of subframes occupied by the decoded control channel.

Alternatively, a mapping rule of the indicator and the number of subframes can be pre-defined. FIG. 8 is an example of pre-defined rule of subframe indicator and the number of subframes occupied by the control channel. After the mobile station decoded the control channel, the mobile station knows the number of subframes occupied by the control channel via the subframe indicator in the decoded control channel. Therefore, the mobile station can calculate the end subframe of the decoded control channel, e.g., subframe 704 shown in FIG. 7.

Figure 9:
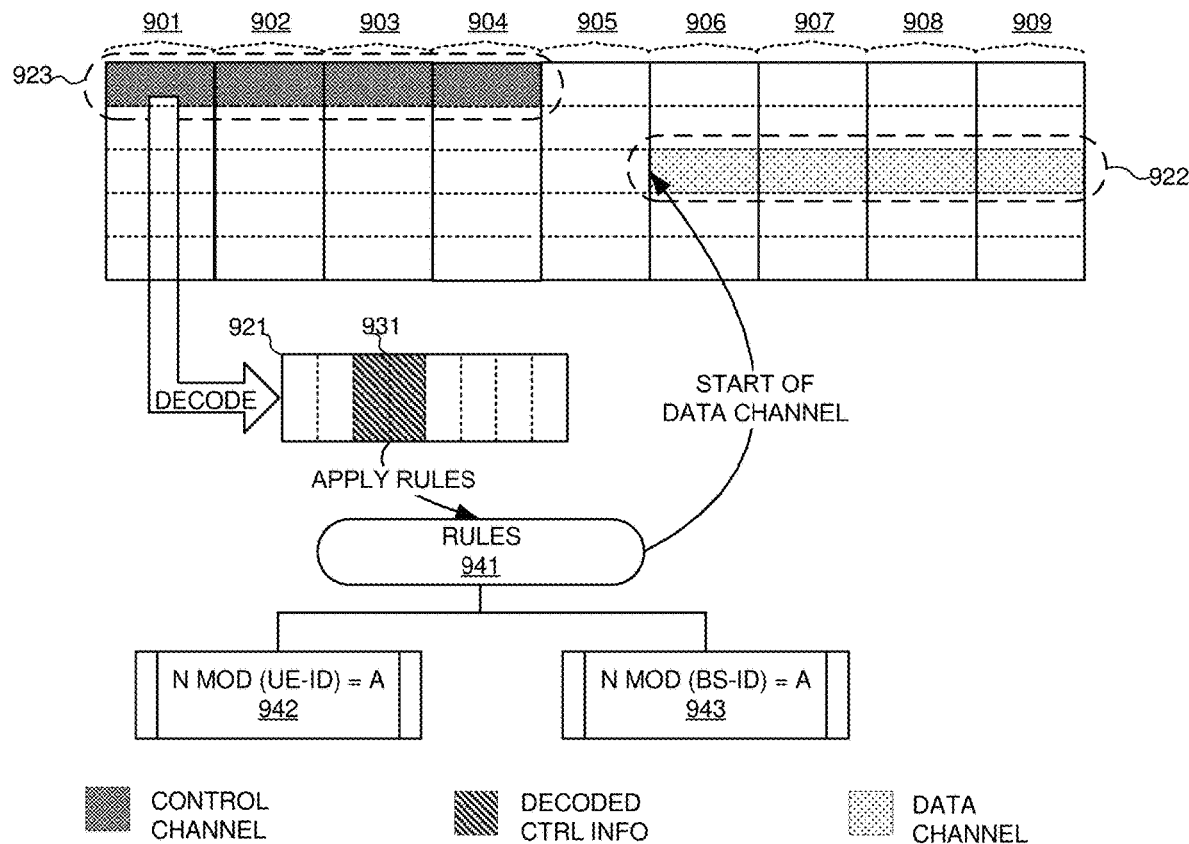
FIG. 9 shows an exemplary diagram of applying rule to the decoded subframe indicator to get the starting subframe of the data channel.

Other rules can be predefined to apply to the obtained subframe indicator. FIG. 9 shows an exemplary diagram of applying rule to the decoded subframe indicator to get the starting subframe of the data channel. A control channel 923 occupies subframes 901, 902, 903 and 904. A data channel 922 occupies subframes 906, 907, 908, and 909. The UE decodes control channel 923. A decoded control channel 921 contains a subframe information 931. Subframe information 931 contains information for the UE to determine the starting subframe of data channel 922.

In one embodiment, the mobile station can obtain a subframe indicator in the decoded control channel and determine the starting subframe of the data channel based on the subframe indicator and a predefined rule. The mobile station upon obtaining subframe indicator 931, applies predefined rules (step 941). In one embodiment, the predefined rule is based on mobile station index (step 942). For example, the mobile station index is the mobile station identity (ID) or RNTI. In another example, the predefined rule is based on the base station identity (step 943). For example, the predefined rule requires the starting subframe of the data channel is the subframe with smallest index after the decoded control channel and it can meet:

$$N \bmod N_{ID} = A$$

where N is the subframe index, $N_{ID}$ is the mobile station index and A is the indicator of the subframe index. In another example, $N_{ID}$ is the base station ID. The base station ID can be a physical ID or a virtual ID.

Figure 10:
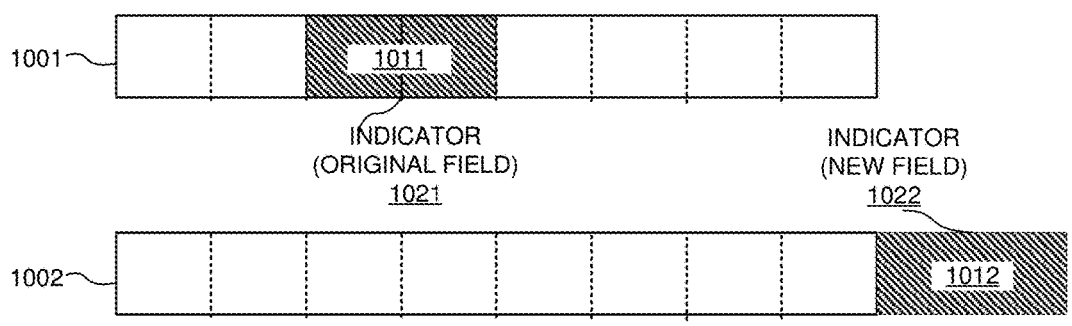
FIG. 10 illustrates some examples of the subframe indicator conveyed in control information in accordance with embodiments of the present invention.

The subframe indicator can be carried in control information in the decoded control channel. For example, the subframe indicator can be some information field in downlink control information (DCI) format. FIG. 10 illustrates some examples of the subframe indicator conveyed in control information in accordance with embodiments of the present invention. In the embodiment, some original field 1011 in DCI format 1001 can be redefined as the subframe indicator 1021. In another embodiment, the subframe indicator 1022 in new field 1012 is added to a new DCI format 1002.

Figure 11:
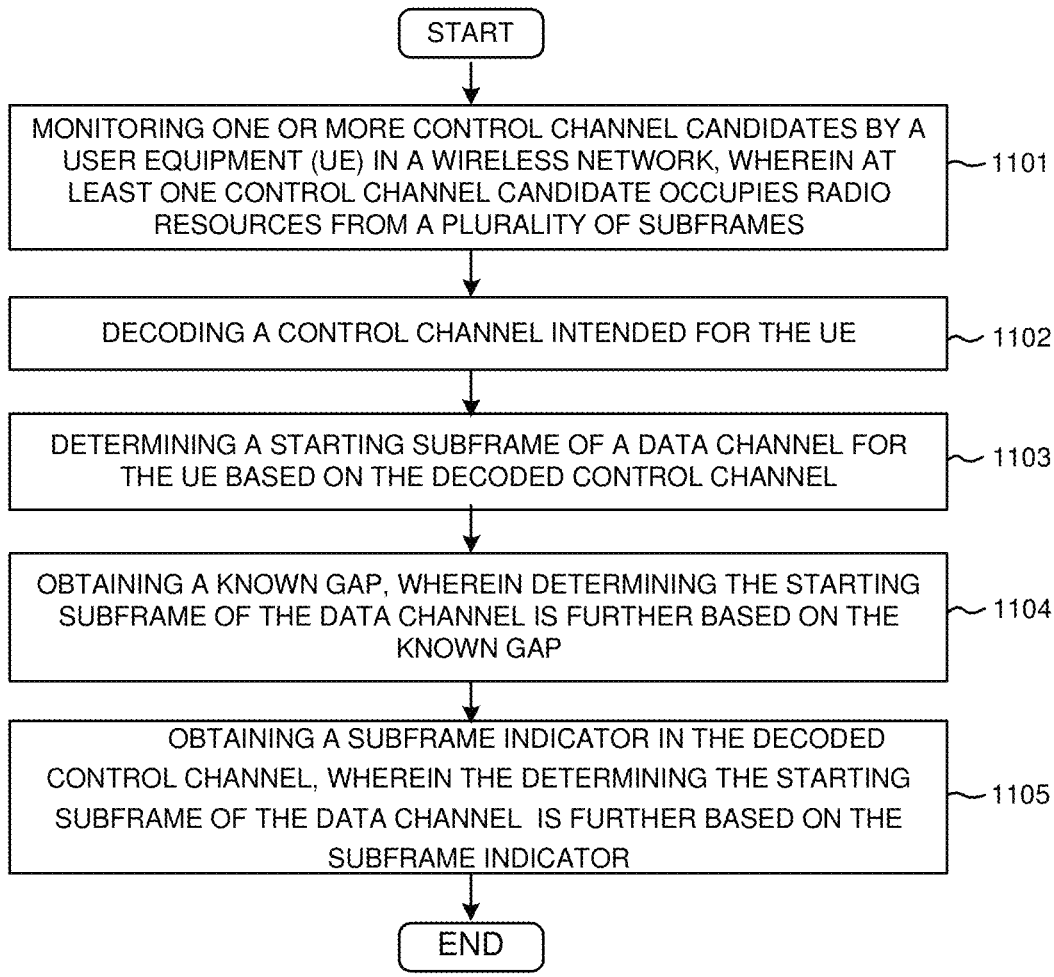
FIG. 11 is an exemplary flow chart for the UE to determine the starting subframe of the data channel in accordance with embodiments of the current invention.

FIG. 11 is an exemplary flow chart for the UE to determine the starting subframe of the data channel in accordance with embodiments of the current invention. At step 1101, the UE monitors one or more control channel candidates by a user equipment (UE) in a wireless network, wherein at least one control channel candidate occupies radio resources from a plurality of subframes. At step 1102, the UE decodes a control channel intended for the UE. At step 1103, the UE determines a starting subframe of a data channel for the UE based on the decoded control channel. At step 1104, the UE obtains a known gap, wherein determining the starting subframe of the data channel is further based on the known gap. At step 1105, a subframe indicator in the decoded control channel, wherein the determining of the starting subframe of the data channel is further based on the subframe indicator.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) monitoring one or more control channel candidates by a user equipment (UE) in a wireless network, wherein at least one control channel candidate occupies radio resources from a plurality of subframes;
   (b) receiving a control channel intended for the UE and obtaining a repetition number for control channel transmission; and (c) determining a starting subframe of a data channel for the UE based on the received control channel and a subframe gap, wherein the subframe gap is a number of consecutive subframes between the starting subframe of the data channel and a reference subframe, and wherein the reference subframe is the last subframe of the control channel, and wherein the last subframe of the control channel is determined based on a starting subframe of the control channel and the repetition number for control channel transmission, and wherein the UE obtains the repetition number for control channel transmission from a downlink control information (DCI).

2. The method of claim 1, wherein the subframe gap is predefined.

3. The method of claim 1, further comprising:
obtaining a subframe indicator in the received control channel, wherein the determining in (c) is further based on the subframe indicator.

4. The method of claim 3, wherein the subframe indicator signals the subframe gap between the starting subframe of the data channel and the starting subframe of the received control channel.

5. The method of claim 3, wherein the subframe indicator signals the subframe gap between the starting subframe of the data channel and the end subframe of the received control channel.

6. The method of claim 3, wherein the subframe indicator signals a subframe index on which the data channel starts.

7. A user equipment (UE) comprising:
a transceiver module that transmits and receives radio signals in a wireless network;
a memory; and
a processor coupled to the memory, the processor configured to
monitor that monitor one or more control channel candidates, wherein at least one control channel candidate occupies radio resources from a plurality of subframes;
receive a control channel intended for the UE and obtains a repetition number for control channel transmission; and
determine a starting subframe of a data channel for the UE based on the received control channel and a subframe gap, wherein the subframe gap is a number of consecutive subframes between the starting subframe of the data channel and a reference subframe, and wherein the reference subframe is the last subframe of the control channel, and wherein the last subframe of the control channel is determined based on a starting subframe of the control channel and the repetition number for control channel transmission, and wherein the UE obtains the repetition number for control channel transmission from a downlink control information (DCI).

8. The UE of claim 7, wherein the subframe gap is predefined.

9. The UE of claim 7, the processor is further configured to:
obtain a subframe indicator in the received control channel, wherein the determining of the starting subframe of the data channel is further based on the subframe indicator.

10. The UE of claim 9, wherein the subframe indicator signals the subframe gap between the starting subframe of the data channel and the starting subframe of the received control channel.

11. The UE of claim 9, wherein the subframe indicator signals the subframe gap between the starting subframe of the data channel and the end subframe of the received control channel.

12. The UE of claim 9, wherein the subframe indicator signals a subframe index on which the data channel starts.

* * * * *